Patented Oct. 21, 1952

2,615,032

UNITED STATES PATENT OFFICE 2,615,032

PROCESS OF PREPARING REACTION PRODUCT OF OLEYL ALCOHOL AND ALUMINUM CHLORIDE

Robert C. Harrington, Jr., Kingsport, Tenn., assignor to Eastman Kodak Company, Rochester, N. Y., a corporation of New Jersey No Drawing. Application January 6, 1950, Serial No. 137,265

3 Claims. (Cl. 260—448)

This invention relates to a novel and convenient process of preparing a reaction product useful as an emulsifying agent.

I have discovered that such reaction products may be prepared by treating the corresponding alcohol with aluminum chloride. The method is particularly applicable to the preparation of a reaction product from oleyl alcohol, an alcohol containing a double bond.

By way of illustrating my invention, I give the following examples:

*Example I.*—3 moles of commercial oleyl alcohol are warmed to 80° C. in a 3-necked flask equipped with a reflux condenser, a thermometer, and an efficient stirrer. One mole of anhydrous aluminum chloride ($AlCl_3$) is added in small portions to the warm oleyl alcohol, with vigorous stirring, care being taken that the temperature does not rise above 150° C. Upon completion of the addition of the anhydrous aluminum chloride, the reaction mixture is stirred and kept at about 90° C. until no more HCl is evolved. As commercial oleyl alcohol is not pure, but contains other fatty alcohols, some of which are saturated, the reaction product obtained from it is not a pure compound. The product is a viscous, dark liquid, which is soluble in ethanol, isopropanol, and hydrocarbon solvents. It is only very slightly soluble in acetone, and forms a white precipitate when the two are well mixed. It is insoluble in water, but forms a white paste, or gel, when triturated in water.

*Example II.*—268 grams (1 mole) of commercial oleyl alcohol is placed in a 3-necked flask fitted with an efficient stirrer and a thermometer. The contents of the flask are warmed to about 40° C., at which point anhydrous aluminum chloride is added in small amounts until 44.4 grams (⅓ mole) has been added, so that the temperature of the reaction does not exceed 110° C. When the reaction is complete (determined by a fall in temperature) the reaction mixture is heated to a temperature not greater than 150° C., and vigorously stirred. A current of air, or preferably nitrogen, is passed through the reaction product until no more hydrogen chloride is evolved. At this point, stirring is discontinued, and the product allowed to cool. In this case the addition of anhydrous aluminum chloride took place over a 30-minute period, but the time of reaction does not seem to be important.

*Example III.*—268 grams (1 mole) of commercial oleyl alcohol is placed in a 3-necked flask fitted with a stirrer, a thermometer, a dropping funnel and a condenser. 44.4 grams (⅓ mole) of anhydrous aluminum chloride is dissolved in a suitable organic solvent, such as nitromethane, and placed in the dropping funnel. The oleyl alcohol is warmed to 40–50° C., and stirring commenced. The aluminum chloride solution is then added slowly, to maintain a temperature of 60–110° C. This addition requires about 15–25 minutes, and when it is complete, the reaction mixture is refluxed for about one hour, the nitromethane serving to maintain a more fluid reaction medium than is the case in Examples I and II. At the end of this time, the nitromethane is distilled off, and carries the remaining hydrogen chloride with it. The yield of a dark, crude, reaction product is again quite high.

*Example IV.*—The reaction was carried out the same as in Example III, except that a reflux condenser was not used, and the temperature was kept closer to 110° C. By so doing, the nitromethane was boiled off during the reaction, along with the hydrogen chloride formed.

In all of the above examples, the yields were very much the same, and the compound was the same dark, viscous oil.

The reaction product made by the above procedure is useful for preparing oil and water emulsions which have high electrical conductivity and which are useful as textile fiber lubricants and anti-static agents. Such emulsions may be prepared by shaking a small amount of such reaction product with a mixture of oil and water which has been made slightly alkaline with such inorganic bases as potassium hydroxide, sodium hydroxide, or ammonium hydroxide, or such organic bases as monoethanolamine, diethanolamine or ethylene diamine. Additional materials, such, for instance, as oleic acid and Terposol (terpene ethers described in U. S. Patent 2,136,011) may be added.

What I claim as my invention and desire to be secured by Letters Patent of the United States is:

1. A process of preparing a reaction product useful as an emulsifying agent which comprises warming a bath of oleyl alcohol to a temperature not in excess of 150° C., slowly adding to the warmed alcohol a solution consisting essentially of anhydrous aluminum chloride dissolved in nitromethane while stirring the oleyl alcohol, distilling off hydrogen chloride and nitromethane vapors whereby a dark, viscous reaction product is obtained which is soluble in ethanol, isopropanol and hydrocarbon solvents.

2. A process of preparing a reaction product of the class indicated which comprises warming a bath of oleyl alcohol to a temperature between 40–150° C., slowly adding thereto anhydrous aluminum chloride, vigorously stirring the aforementioned ingredients while continuing the warming of the materials until substantially no more HCl is evolved, whereby a viscous, dark liquid reaction product is obtained which is soluble in ethanol, isopropanol and hydrocarbon solvents.

3. A process in accordance with claim 2 wherein the dark, viscous liquid reaction product is shaken with a mixture of oil and water which has been made slightly alkaline by adding a base thereto.

ROBERT C. HARRINGTON, Jr.

REFERENCES CITED

The following references are of record in the file of this patent:

UNITED STATES PATENTS

| Number | Name | Date |
|---|---|---|
| 2,191,499 | Reiff | Feb. 27, 1940 |

OTHER REFERENCES

Norris et al., Jr. Am. Chem. Soc., vol. 61, pages 1413 to 1417, June 1939.